Aug. 24, 1965   G. F. SACHSEL ETAL   3,202,533
METHOD OF ENCAPSULATING LIQUIDS
Filed July 24, 1962
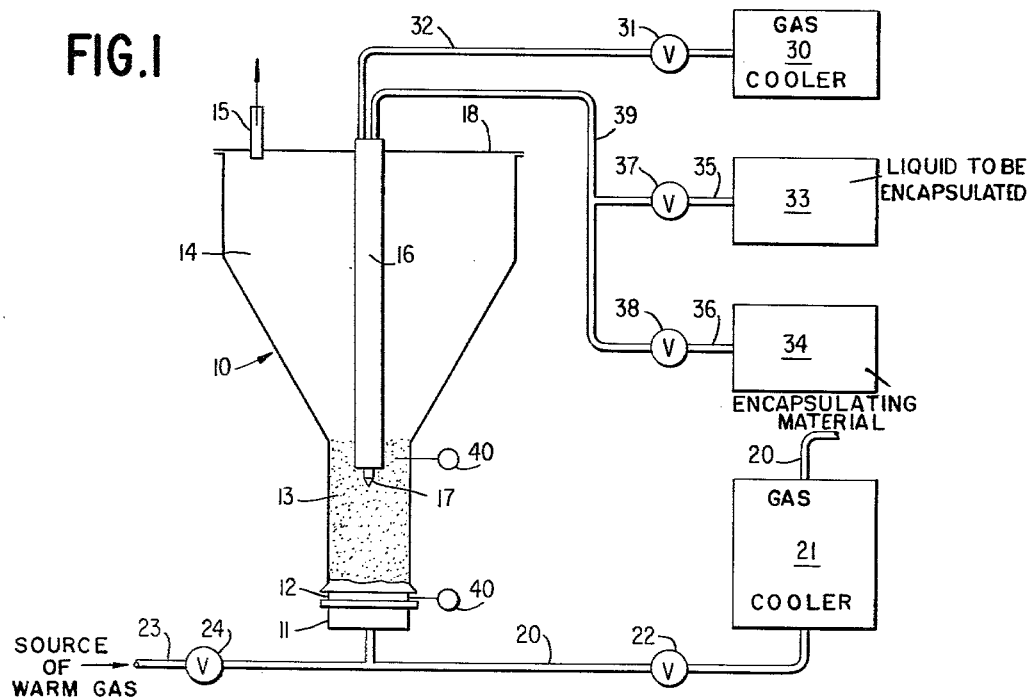
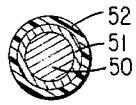
FIG.2
FIG.3
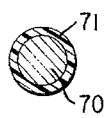
FIG.4
FIG.5
FIG.6
INVENTORS
HERMAN NACK
GEORGE F. SACHSEL
BY
*Sughrue, Rothwell, Mion & Zinn*
ATTORNEYS

United States Patent Office 3,202,533
Patented Aug. 24, 1965

3,202,533
METHOD OF ENCAPSULATING LIQUIDS
George F. Sachsel, Worthington, and Herman Nack, Columbus, Ohio, assignors, by mesne assignments, to International Business Machines Corporation, New York, N.Y., a corporation of New York
Filed July 24, 1962, Ser. No. 212,056
8 Claims. (Cl. 117—72)

The present invention relates to a method for encapsulating normally liquid materials; that is, materials which are in a liquid state at normal conditions of temperature and pressure.

Various methods are known for producing encapsulated liquids. Common prior art techniques include passing droplets of the liquid through a bath of molten coating material so that a film of the coating congeals on the surface of the liquid droplet. A number of chemical methods have also been developed whereby liquids are emulsified and an encapsulating film is precipitated on the surface of the dispersed liquid droplets.

The encapsulating methods generally described have certain drawbacks. Coating of droplets by passing them through a molten bath of film-forming material for the most part is restricted to the production of large diameter encapsulated products enabling the encapsulated material to be easily handled and separated from the molten bath by gravity or by other simple mechanical procedure. The chemical methods, on the other hand, are relatively tedious in that they require extremely careful control of the encapsulating conditions. Moreover, the products are not as uniform or as reproducible as might be desired.

Desiring to produce superior encapsulated liquids by improved techniques, we have developed a new method for encapsulation which is extremely useful and efficient and which enables the production of uniform, small-diameter particles.

In general, it is an object of the present invention to produce encapsulated liquids in a manner which is fast, efficient, easily controlled, and which results in uniform and reproducible products.

A further object of the present invention is to produce encapsulated liquids, such as dye-containing or dye-forming liquids, which are of a character which enable them to be coated on a substrate to serve as a transfer medium.

Another object of the present invention is to provide a highly efficient method for encapsulating liquids by which a plurality of liquids, either mutually miscible or immiscible, may be combined within the same capsule.

Another object of the present invention is to produce encapsulated dye-containing or dye-forming liquids of a capsule size and consistency enabling the material to be used as a transfer coating on various substrates.

A further object of the invention is to produce encapsulated materials which are strong and stable, which have good shelf life, and which resist any tendency of the encapsulating layer to rupture or break down.

In general, according to our invention, the material which is to be encapsulated is some material which is liquid at normal temperatures or at the temperature of use. In order to encapsulate such a liquid material, it is proposed to transform it into the solid state in the form of small particles, by finely dividing and cooling the liquid below its freezing point. In some instances, the liquid in question may be frozen around discrete core particles, or the liquid itself may be frozen to form individual frozen cores. Next, the individual frozen particles are fluidized in an appropriate chamber by means of a suitable gaseous current. The gas employed may be air or some inert gas, such as nitrogen, or other gaseous medium suited to the specific encapsulating materials.

When a fluidized bed of the frozen particles has been established, they are then coated by spraying into the chamber a solution of coating material in a volatile solvent. This accomplishes a uniform and complete coating on the surfaces of the frozen particles.

It is important to note that the film-forming or encapsulating material should be substantially insoluble or only slightly soluble in the material which is encapsulated, so that upon thawing, the film is not destroyed by solution in the liquid.

The coated particles are maintained in the fluidized condition until the solvent is completely removed, the fluidization being carried out at a temperature below the freezing point of the encapsulated liquid.

Next, the product may be recovered from the fluidized bed and stored for use or immediately put to use at any temperature below the melting point of the encapsulating layer.

Other objects and advantages of the present invention will become apparent from the following description and claims taken together with the drawing which represents by way of illustration preferred embodiments of the present invention.

In the drawings:
FIGURE 1 is a schematic representation of a system of apparatus for carrying out the method of the present invention.
FIGURES 2, 3, 4, and 5 are schematic cross-sectional views of encapsulated products produced according to this invention; and
FIGURE 6 is a cross-sectional view of a transfer medium comprising the products of the present invention.

Referring specifically to the drawings, FIGURE 1 illustrates a fluidized bed system 10 for carrying out the method of the present invention. The apparatus 10 comprises an air inlet 11, a distributor plate 12 and a fluidized bed chamber 13. Upper chamber 14 is an extension of the fluid bed chamber 13 and is provided with an exhaust outlet 15.

Conduit 16, terminating in nozzle 17, extends through lid 18 which covers chamber 14. Fluidizing air conduit 20 passes through an air cooler 21 and valve 22 before entering the air inlet 11 of the fluidizing bed apparatus. Conduit 23 and valve 24 are connected with a source of relatively warm fluidizing gas so that the temperature of the gas in the bed may be controlled by mixing various proportions of cold and warm gas.

Conduit 16 communicates with gas cooler 30 through valve 31 and gas line 32.

The liquid to be encapsulated is stored in tank 33 and the encapsulating liquid is stored in tank 34.

Conduits 35 and 36 connect the stored liquids with valves 37 and 38 which in turn enable one or the other of the liquids from tank 33 or 34 to be passed through line 39 into conduit 16 and finally through nozzle 17.

In operation, solid core particles or nuclei, in finely divided or powdered condition, are introduced into fluidizing chamber 13 onto distributor plate 12. The distributor plate is porous and permits the cooled gas from gas cooler 21 to pass in to the fluidizing chamber 13. Distributor plate 12 may be rotated or manipulated to create turbulence in chamber 13 in order to maintain the core particles in an active, fluidized state.

Thermometers 40 may be inserted in fluidizing chamber 13 at various points to measure the internal temperature.

The liquid from tank 33 which is to be encapsulated is then pumped through conduit 35 through valve 37 and conduit 39 into inlet conduit 16. Simultaneously, spraying or atomizing gas is pumped through gas cooler 30 through open valve 31 into conduit 32 and then into inlet conduit 16.

The cooled spraying gas and the liquid to be encapsulated are mixed in conduit 16 and sprayed out through nozzle into the fluidized bed of core particles.

The temperature in chamber 13 is maintained at a point well below the freezing point of the liquid to be encapsulated as measured by thermometers 40 so that the liquid congeals on the surface of the core particles. The application of liquid in this manner may be carried out in a single step or by incremental step-wise build-up of frozen liquid layers on the core particle. Thus, for example, a mist of liquid and spraying air may be introduced into chamber 13, the spraying may then be interrupted until the liquid is completely frozen on the surface of the core particles and then spraying may be begun again. This procedure will then be repeated until the desired thickness of the frozen layer is achieved.

When the desired frozen liquid build-up has been produced, valve 37 controlling liquid flow from tank 33 is closed and valve 38 is opened to permit coating material from tank 34 to be sprayed through nozzle 17. The coating material is then sprayed into chamber 13 and an encapsulating layer of the desired thickness is built up on the frozen liquid core particles.

After the coating operation has been completed, the bed is maintained in a fluidized state until the coating film has had a chance to set, and the encapsulated particles are then removed from fluidizing chamber 13.

The upper chamber 14 of the fluidizing apparatus is continuously exhausted through line 15 during the encapsulating operation to remove any matter which may be volatilized.

Turning now to a consideration of the various products which may be produced according to the present invention, FIGURES 2, 3 and 4 of the drawings are illustrative of some of the preferred encapsulated products.

Where core particles of normally solid material, such as clay, silica, or other finely divided matter, are employed, the encapsulated particles will generally comprise three elements, the normally solid core particles 50, the normally liquid material 51 to be encapsulated, and the normally solid encapsulating film 52.

Attapulgite clay is a very satisfactory material for use as core particles or nuclei in the present process. However, the invention is not limited to the use of this material inasmuch as any material, solid at the temperature of the fluid bed, may be employed. The particular core particles employed in a given system should be capable of being provided in a finely divided form and should be compatible with the material which is to be coated upon it. Satisfactory materials used as core particles in the invention are as follows: Attapulgite clay, alumina, bentonite, calcium carbonate, metal powders, silica, sodium hydroxide, sodium carbonate, sodium chloride, sodium thiocyanate, ferric chloride, ferric sulphate, crystal violet, etc. Of course, the frozen liquid to be encapsulated may itself serve as the core particles.

While the following description contains a detailed example of carrying out the present invention involving the use of a specific liquid dye as the material encapsulated, it will be apparent that a wide variety of other liquids may be encapsualted including, for example, the following colored or color-forming systems:

Leuco dyes

Leuco dyes develop color on mild oxidation by acid-like organic or inorganic material. Illustrative of suitable leuco dye systems are triarylmethanes, oxazines, thiazines, and indigos.

Dyes developed in response to pH change

Phthalein or rosaniline derivatives are typical of such systems which may be converted to colored dyes by acid- or base-washed resins and clays.

Metal chelates

Examples of such materials which may be employed in the present invention are colorless or light-colored metal salts, such as aluminum, lead, and zinc acetates, ferric manganese and stannous sulphate and cadmium, cobalt, mercurous and nickel chloride which form colored chelates with a wide variety of polar organic molecules. Organic compounds which may be used for chelate formation include: rubeanic acid, oximes, hydroxy-quinoline, hydroxamic acids, benzimidazoles, hydroxy-α-pyrones, phenanthrolines, pyrazolones, diphenyl carbazides, pyridine derivatives, phenylpyruvic acids, 2-thenoyltrifluorocetone, enediols, diketones, and tropolones.

Condensation products

Colored products may be produced by condensation reactions, such as Schiff-base formation from aldehydes and benzidines. Typical of materials undergoing such color-forming reactions and providing suitable liquid systems for encapsulation according to the present invention are the following: p-diethylaminobenzaldehydes with pyrroles, the condensation of 1,2-naphthoquinone-4-sulfonate with amines and active methylene compounds, and Michler's ketone condensations.

Azo dyes

The hydrazo analogues of various azo dyes form colorless or light-colored materials which are suscetpible to oxidation and which may be encapsulated according to the present invention.

Likewise, other materials besides styrene may be employed as the encapsulating layer. Suitable materials for this purpose include: methacrylate resins, natural and synthetic waxes, asphalt and tar, polyolefins, shellac, natural and synthetic gums, hard fats, gelatin, sugars and sugar compounds, film-forming resins and plastics, Saran, polyvinylchloride, lacquers, varnishes, and the like.

The encapsulating materials may be applied in the form of solutions, hot melts, vapor condensations, slurries, emulsions, or other physical forms adaptable to the fluidization coating method.

Non-resinous materials suitable as encapsulating materials include: sodium silicate, gluten and related natural film formers, starch, and wax.

It should also be clear that the various encapsulating systems are not limited to the use of specific solvent, it only being necessary that the solvent is volatile at the operating conditions of the specific fluidized bed. For example, in the coating of styrene, the following solvents may be employed: n-butyl chloride, methylene chloride, ethylene chloride, chloroform, benzyl alcohol, ethyl, acetate, tetrahydrofuran, carbon bisulfide, etc.

In coating with cellulose acetate, the following are suitable solvents: ethyl acetate, tetrahydrofuran, methylene chloride, chloroform, carbon tetrachloride, and acetone.

In coating with cellulose nitrate, the following are suitable solvents: methyl alcohol, benzyl alcohol, tetrahydrofuran, acetone, and methylethylketone.

In coating with polymethylmethacrylate, the following are suitable solvents: benzyl alcohol, ethyl acetate, methylene chloride, chloroform, acetone, and carbon bisulfide.

In coating with vinyl chloride, the following is a suitable solvent: ethylene dichloride.

Where the products are to be employed in the manufacture of transfer media or the like, the liquid which is encapsulated may be any dye-containing or dye-forming liquid whose physical and chemical properties are adaptable to the present method for encapsulation and to the intended end use of the products. In general, it should be noted that the liquid may simply be a dye-containing aqueous or organic carrier. On the other hand, the liquid may contain one component of an azo dye-forming system and may be associated with similarly formed capsules containing the second component of the system so that, upon rupture of the capsules under the pressure of a stylus, a color-forming reaction is produced.

According to the invention, the encapsulated liquid may also be of a type which undergoes a color-forming reaction upon exposure to air or to the moisture of the atmosphere, so that under the capsule rupturing pressure of a stylus or type bar, a characteristic color is produced.

As illustrated in FIGURE 3 of the drawing, the solid core particle 60 may be coated with a plurality of discrete frozen films 61 and 62. Upon warming and returning to the liquid state, the materials 61 and 62 may be miscible or immiscible liquids which interreact or are potentially reactive to produce the desired color formation. Such particles are also encapsulated by a layer of film-forming or coating material 63.

FIGURE 4 illustrates particles produced according to the present invention wherein the liquid to be encapsulated 70 is frozen to form a finely divided core particle upon which the encapsulating material 71 is coated.

Another embodiment of the present invention is illustrated in FIGURE 5 of the drawing where the core particle 80 is itself a frozen liquid. The frozen core 80 is then coated with a layer of frozen liquid 81 which may be a component of a dye-forming or color-forming system, a liquid which reacts with water to produce the color or a frozen liquid miscible with water containing a suitable dye. The frozen core 80 and frozen surface layer 81 are then encapsulated with a film 82 of coating material.

One of the preferred uses of the materials produced according to the present invention is in the production of manifolding materials, such as carbonless transfer papers as illustrated in FIGURE 6 of the drawing. Any suitable substrate 90, such as paper or plastic, may be coated with a thin film 91 of encapsulated particles 92 produced according to the present invention. The encapsulated particles 92 may be of such a nature that they are naturally adherent to the substrate, but where this is not the case, a binder may be mixed with the particles 92 so that they may be evenly and adherently distributed over the surface of the substrate 90. The binder may also contain materials reactive with the liquid encapsulated in particles 82 to produce a pressure-sensitive system capable of color formation upon rupture of the capsule 82.

The method of the present invention and the nature of the products obtained will perhaps be better understood in the light of the following example.

In an apparatus of the type schematically illustrated in FIGURE 1 of the drawing, 300 grams of attapulgite clay is introduced into the fluidizing bed chamber 13 through cover plate 18 where it falls onto distributor plate 12. Cooled gas, in this case air, is then introduced through gas inlet 11 and distributor plate 12 to agitate and fluidize the finely divided attapulgite clay. The walls of chamber 13 are preferably of glass so that it is possible to observe directly the condition of the fluidized bed and to adjust the flow of gas to obtain optimum fluidization. The gas cooler 21 is packed with solid carbon dioxide, and the temperature in chamber 13 is maintained at −60° F. by the mixing of warmer air through line 23 with the cooled gas in line 20.

Phenyl Cellosolve containing 1% of a dye is then pumped through conduit 35 and valve 37 into conduit 39. The specific dye employed is 2,3'-dimethyl-4'(2-hydroxy-1-naphthyl azo) benzene, a Sudan IV type dye (DuPont oil red). Precooled gas, air in this instance, is pumped from cooler 30 through valve 31 and conduit 32 into conduit 16, wherein the air and phenyl Cellosolve-dye liquid are mixed and sprayed through nozzle 17 into fluidized bed 13.

In this manner, 250 grams of the phenyl Cellosolve and dye are sprayed into the fluidized bed over a period of about 35 minutes, building up frozen films of the phenyl Cellosolve and dye on the surface of the fluidized attapulgite clay particles.

When this operation has been completed, valve 37 is operated to close conduit 35. Valve 38 is then opened, so that the coating solution in tank 34 may be introduced into conduit 16 and sprayed into fluidized bed chamber 13. The coating solution comprises a 5% solids solution of polystyrene resin in methylene chloride.

About 300 grams of the resin solution is sufficient to satisfactorily encapsulate each of the core particles with their frozen liquid surface films. During the addition of the resin coating solution, the upper chamber 14 is evacuated through port 15 to remove volatilized solvent.

After the coating has been completed, the particles are removed from the fluidized bed chamber. At normal temperatures, the frozen materials within the outer shell of styrene resin return to their normally liquid condition. The very fine attapulgite clay nucleus, of course, remains solid and is entrapped within the resin capsule.

The finely divided capsules may then be coated on a substrate or mixed with a binder and then coated on a substrate for the production of carbonless transfer materials as shown in FIGURE 6 of the drawing.

To produce materials of the type illustrated in FIGURE 3 of the drawing, a similar method is followed except that different normally liquid color-forming materials are sprayed onto the core particles to build up separate layers of frozen color former which are then encapsulated in the same manner as described in Example I.

While cooling of the fluidized bed below the freezing point of the liquids to be encapsulated may be accomplished by fluidizing with precooled air, the same result may be achieved by other methods. For example, air may be saturated with an aqueous vapor and supercooled to about −5° C. The supercooled saturated air may then be intoduced into the fluidized bed which has been previously cooled with relatively dry air to about −30° C. Ice particles then form on the fluidized particles and the resulting ice crystals are then coated and encapsulated as previously described.

The fluidized bed may also be cooled by adding powdered or crushed Dry Ice directly to the fluidized bed chamber or by spraying into the fluidized bed liquid carbon dioxide or another low-boiling liquid, such as methylene chloride. Such volatile materials cool the bed by absorption of heat on evaporation.

Other variations in the procedure may also be developed by those skilled in the art with regard to the manner in which the liquid is introduced into the fluidized bed. For example, in the principal embodiment, the liquid to be ancapsulated in mixed with air and sprayed through a nozzle into the fluidized bed. It is also possible to saturate air or other gas with the liquid, admit the saturated air to the bed, and then permit the liquid to condense and congeal on the surface of core particles.

It will be apparent that although air is generally used as the fluidizing and spraying gas, other gases might also be employed in a similar manner. For example, nitrogen or other inert gas may be substituted for air.

It is also apparent that the fluidizing and spraying air or gas may be previously treated by drying, filtering and the like to improve its function in the fluidizing and coating steps.

It is important to note that it has been found highly desirable to immerse the nozzle 17 below the level of the fluidized bed so that the contact between the coating material and the frozen core is facilitated. This arrangement also overcomes the problem of stringing encountered when the nozzle is above or at least apart from the fluidized bed wherein the liquid or coating material must traverse a space exposed to low temperature gas before contacting the particles of the fluidized bed.

While there have been shown and described certain preferred embodiments of the present invention, it will be apparent to those skilled in the art that various changes of procedure and materials might be made without departing essentially from the spirit of the invention or from the scope of the following claims.

What is claimed is:

1. A method for encapsulating liquids comprising forming discrete frozen core particles of the liquid, fluidizing a bed of said frozen core particles and coating said frozen core particles with a continuous solid film of encapsulating material while said frozen core particles are in a fluidized condition.

2. A method for encapsulating liquids comprising forming discrete frozen core particles from the liquid, fluidizing a bed of said frozen core particles in a gaseous stream, and coating said frozen core particles with a continuous solid film of encapsulating material which is substantially insoluble in said liquid while said frozen core particles are maintained in a fluidized condition.

3. A method for encapsulating liquids comprising forming discrete frozen core particles of the liquid, forming a fluidized bed of said frozen core particles at a temperatur below the freezing point of said liquid, spraying into said fluidized bed a solution of an encapsulating material in a solvent which is volatile at temperatures below the freezing point of said liquid, evaporating said solvent to deposit a solid film of said encapsulating material on the surface of each of said core particles while maintaining said core particles in a fluidized condition and then recovering the encapsulated liquid.

4. A method for encapsulating liquids comprising fluidizing a bed of solid core particles, maintaining the temperature of the fluidized bed below the freezing point of the liquid to be encapsulated, spraying the liquid to be encapsulated into said fluidized bed to produce solid core particles having surface films of said frozen liquid and coating said solid core particles and frozen liquid surfaces with a solid film of an encapsulating material while in a fluidized condition.

5. A method for encapsulating liquids comprising forming a fluidized bed of solid core particles, maintaining the temperature of said fluidized bed below the freezing point of said liquid, contacting said solid core particles with said liquid to produce solid core particles coated with frozen surface film of said liquid while said core particles are maintained in a fluidized condition, coating said core particles with a solution of an encapsulating material, evaporating the solvent from said solution to deposit a solid film of said encapsulating material on the surface of each of said core particles, and recovering the encapsulated particles from the fluidized bed.

6. A method for encapsulating liquids comprising forming a fluidized bed of attapulgite clay particles, maintaining the temperature of the fluidized bed below the freezing point of a liquid dye which is to be encapsulated, contacting the fluidized attapulgite clay particles with the liquid color former so as to form frozen films of the liquid on the attapulgite clay particles, contacting the particles coated with frozen liquid with a solution of a film-forming resin while said particles are still in the fluidized condition, evaporating the solvent of said solution to deposit a solid film of encapsulting material on the surface of the particles, and recovering the encapsulated materials from the fluidized bed system.

7. A method for encapsulating a liquid comprising phenyl Cellosolve and a dye comprising forming a fluidized bed of inorganic particles, spraying the phenyl Cellosolve and dye liquid into the fluidized bed, maintaining the fluidized bed at a temperature below the freezing point of the phenyl Cellosolve and dye thus producing frozen films of phenyl Cellosolve and dye on the surfaces of the inorganic particles, maintaining the inorganic particles and frozen films of phenyl cellosolve and dye in a fluidized condition and spraying into the fluidized bed a solution of a polystyrene resin in a volatile solvent, maintaining the fluidized bed and evaporating the voltatile solvent to deposit a solid film of polystyrene on each inorganic particle coated with said frozen film of phenyl Cellosolve and dye.

8. The method of claim 7 wherein the volatile solvent is methylene chloride.

References Cited by the Examiner

UNITED STATES PATENTS

| | | | |
|---|---|---|---|
| 2,865,868 | 12/58 | McKinley et al. | |
| 2,969,331 | 1/61 | Brynko et al. | 117—36.2 |
| 2,986,475 | 5/61 | Mesnard et al. | 117—100 |
| 3,001,228 | 9/61 | Nack | 117—100 |
| 3,016,308 | 1/62 | Macaulay | 117—36.1 |
| 3,041,289 | 6/62 | Katchen et al. | 117—36.8 |
| 3,080,251 | 3/63 | Claus | 117—100 |

WILLIAM D. MARTIN, *Primary Examiner.*

MURRAY KATZ, *Examiner.*